United States Patent [19]
Ott

[11] Patent Number: 6,092,785
[45] Date of Patent: Jul. 25, 2000

[54] DEVICE FOR TRANSFERRING FLUIDS FROM A STATIONARY TO A ROTATING MACHINE PART

[75] Inventor: Stephan Ott, Wiesbaden, Germany

[73] Assignee: Gat Gesellschaeft fur Antriebstechnik mbH, Wiesbaden, Germany

[21] Appl. No.: 09/184,755

[22] Filed: Nov. 2, 1998

[30] Foreign Application Priority Data

Nov. 8, 1997 [DE] Germany .......................... 197 49 531

[51] Int. Cl.$^7$ ................................................ F16L 29/00
[52] U.S. Cl. ................................. 251/149.9; 251/149.5; 285/9.2; 285/101
[58] Field of Search .......................... 251/149.9, 149.5; 137/614.05; 285/9.2, 101, 148.27

[56] References Cited

U.S. PATENT DOCUMENTS

| | | | |
|---|---|---|---|
| 4,905,965 | 3/1990 | Dolev | 251/149.9 |
| 5,683,148 | 11/1997 | Li et al. | 251/149.5 X |
| 5,707,186 | 1/1998 | Gobell et al. | 137/580 X |

*Primary Examiner*—Kevin Lee
*Attorney, Agent, or Firm*—Killworth, Gottman, Hagan & Scaeff LLP

[57] ABSTRACT

The present invention relates to a device for transferring at least one fluid from a stationary machine part (1) to a machine part (3) rotatable about an axis of rotation (10), wherein at least one of at least two mutually engageable sealing surfaces (2, 4) is arranged on each of the stationary (1) and rotatable (3) machine parts and wherein a transfer opening is provided in each of the sealing surfaces which is in turn connected with supply or discharge lines. In order to provide a device with the above-mentioned features, which is in particular of simpler construction and easier to produce and which nevertheless makes it possible for a single transfer opening to supply different media from the stationary machine part to the rotating machine part, it is proposed according to the invention that the respective sealing surfaces (2, 4) and transfer openings (13, 14) be arranged eccentrically with respect to the axis of rotation (10), the device being adapted for preferably automatic setting of the rotatable machine part (3) in a desired rotational position.

14 Claims, 2 Drawing Sheets

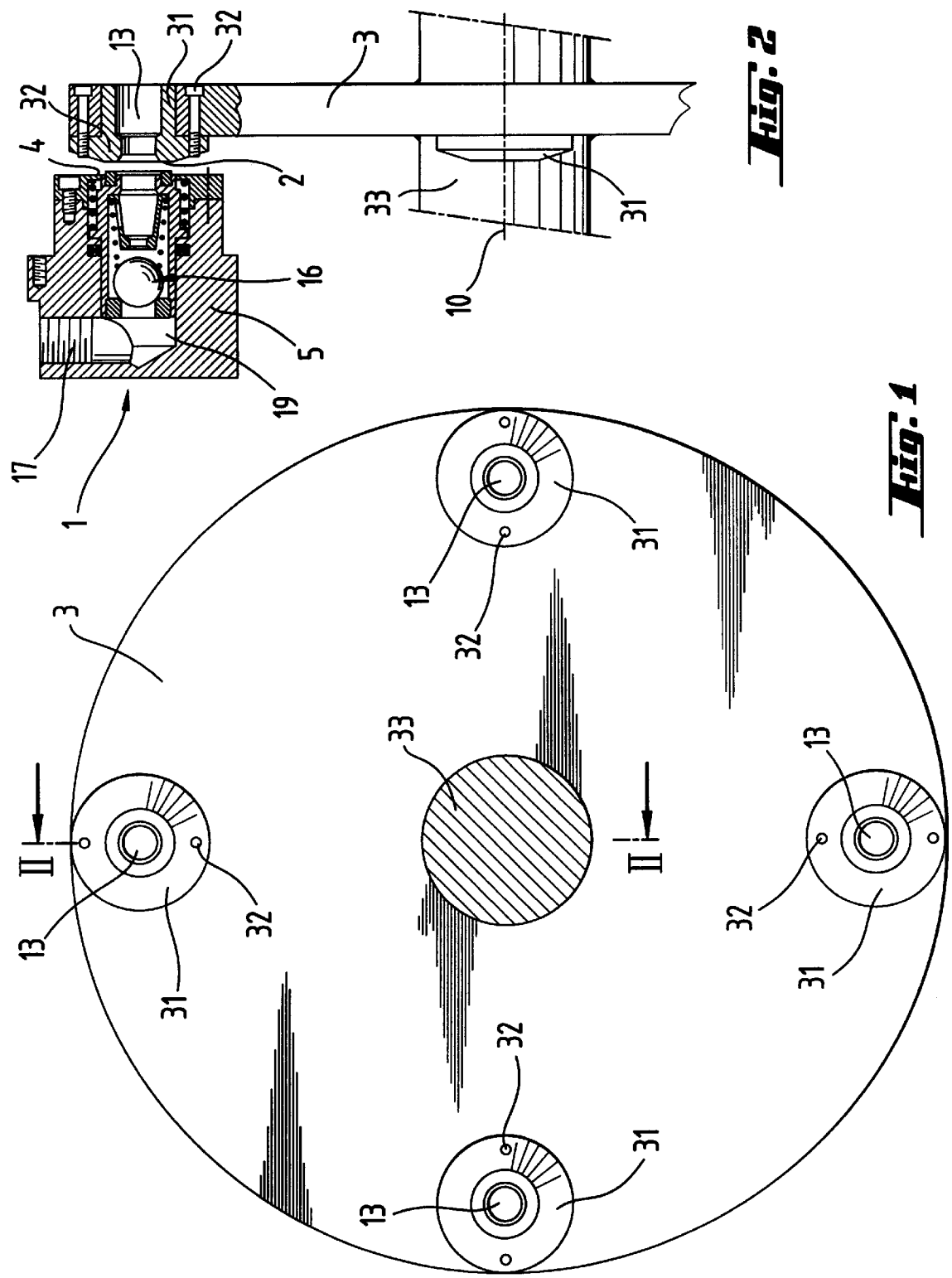

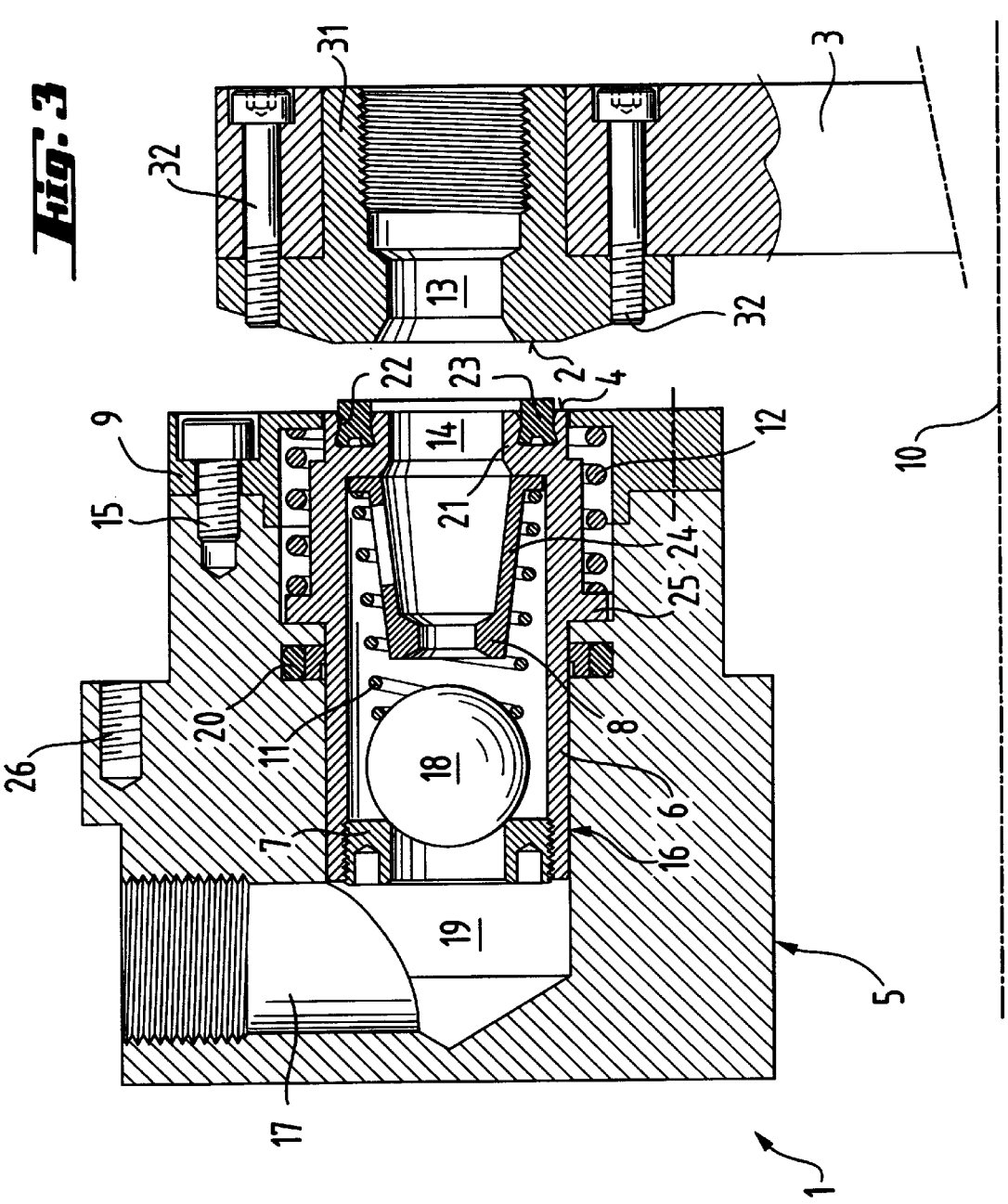

DEVICE FOR TRANSFERRING FLUIDS FROM A STATIONARY TO A ROTATING MACHINE PART

BACKGROUND OF THE INVENTION

The present invention relates to a device for transferring at least one fluid from a stationary machine part to a machine part rotatable about an axis, wherein at least one of at least two mutually engageable seal surfaces is arranged on each of the stationary and the rotating machine parts and wherein a transfer opening is provided in each of the sealing surfaces which is in turn connected with supply and/or discharge lines for the fluid.

Devices of this type have long been known, in which fluid supply is effected centrally through an internal bore along the axis of the rotatable machine part.

A device is also already known, in which supply is effected via supply grooves and openings, which are provided in conical sealing surfaces which are arranged not in the centre of the duct but rotationally symmetrically with respect to the axis of rotation. If duct openings and grooves as well as seals between these grooves are provided in different axial positions, these each being connected inside the rotatable part with their own discharge line, two or more different fluids may be supplied to the rotatable machine part via different lines with this system.

This system is relatively complex to produce owing to the conical sealing surfaces and the complicated sealing means. Moreover, a common factor of all known systems is that, as a rule, only a single fluid may be transferred from the stationary to the rotatable machine part through any given duct, unless the fluid which is still present in the supply lines is removed each time the fluids are changed.

SUMMARY OF THE INVENTION

On the basis of this prior art, the object of the present invention is to provide a device with the above-mentioned features, which is in particular of simpler construction and easier to produce and which nevertheless makes it possible for a single transfer opening to supply different media from the stationary machine part to the rotating machine part.

This object is achieved in that the sealing surfaces and transfer openings are arranged eccentrically with respect to the axis of rotation and in that means are provided for preferably automatic setting of the rotatable machine part in a desired rotational position. Thus, no parts have to be produced which are rotationally symmetrical with respect to the axis of rotation, in particular no conical sealing surfaces which are symmetrical relative to the axis of rotation, the production of these surfaces being relatively complex. Instead, according to the invention the sealing surfaces and their associated transfer openings are arranged eccentrically with respect to the axis of rotation, i.e. in a given angular position outside the axis of rotation.

Although in the known system with conical sealing surfaces, duct openings leading off from seal surfaces are also provided in a particular angular position relative to the axis of rotation, these openings in the known system are provided in at least one of the sealing surfaces with circumferential grooves which permit fluid to be supplied from any direction.

In contrast, in the case of the present invention means are provided which permit the rotatable machine part to be set in a particular rotational position, wherein this rotational position which it is desired to set is naturally so selected that associated sealing surfaces or transfer openings on the stationary and rotating machine parts are located opposite each other. It follows naturally therefrom that transfer of the fluid does not occur during rotation of the rotating machine part but only when the latter is at a standstill. It additionally follows that the sealing surfaces are not in contact with each other during rotation of the rotatable machine part and may be moved past each other. On the other hand, the sealing surfaces may be brought into contact with each other as soon as the rotatable machine part is fixed in the desired position of engagement.

It is advantageous for the stationary machine part to be provided with a valve which closes the duct opening in the stationary machine part close to the sealing surface. In this way, the discharge of relatively large amounts of the fluid to be transferred is prevented when the sealing surfaces are being brought out of engagement with each other after transfer and before the rotatable machine part is set in motion.

It may also be advantageous for the rotatable machine part also to comprise a corresponding valve, which closes the duct opening in the vicinity of the associated sealing surface.

Such valves advantageously take the form of non-return valves which are prestressed counter to the direction of flow of the fluid. In order to open these non-return valves, therefore, the fluid pressure has to overcome the prestressing force of the relevant valve springs.

An embodiment of the invention is preferred in which the duct opening and accordingly also the sealing surface of the rotatable machine part are arranged on a bracket connected with the rotatable machine part. By means of such a bracket, a relatively large distance from the axis of rotation may be obtained, which permits easier separation of the central drive and actuation components of the rotatable machine part from the supply means for the fluid.

In a particularly preferred embodiment of the invention, a plurality of brackets are provided which are preferably arranged symmetrically with respect to the axis off rotation. Symmetrically to the axis of rotation here means at like angular distances. Two brackets would thus be arranged in precisely diametrically opposed positions, three brackets would be offset by 120° relative to one another, etc.

Multiple corresponding transfer means with sealing surfaces and duct openings may also be arranged on the stationary machine part, again preferably at equal angular distances, i.e. symmetrically with respect to the axis of rotation. In the event of an equal number of ducts being provided on the stationary and rotating machine parts in the same symmetrical arrangement relative to the axis of rotation, a plurality of fluid ducts may accordingly also be operated simultaneously if the rotatable machine part stops in the desired rotational position. The same or different fluids may be supplied through the different transfer means. Furthermore, the rotational positions may also be varied, such that different fluids are supplied through the respective transfer openings on the rotatable machine part.

It is, for example, also possible to provide only one or two ducts on the rotatable machine part, for example on brackets, but for a greater number of transfer elements to be arranged on the stationary machine part, through which transfer elements different fluids are supplied. Depending on the rotational position, different supply elements then come into sealing engagement with the transfer openings on the rotatable machine part, such that different fluids may be selectively supplied, for example in the case of rotating machines for cutting machining it might be desired to supply liquids for cooling and scouring purposes or compressed air for blowing through bores to free them from bore chips, hydraulic oils or compressed air for pneumatic drives, chemical reagents etc.

In the case of a pair of mutually opposed sealing surfaces, it is advantageous to provide, in at least one of these surfaces, a groove encircling the transfer opening for accommodating a preferably resilient sealing ring. If the opposing parts are then brought into engagement with each other, the sealing surfaces on the stationary and rotating machine parts do not come directly into contact, but rather only via the interposed sealing ring.

In the preferred embodiment of the invention, which is designed to permit the transfer of different fluids to the rotating machine part through the same or different ducts, the sealing surfaces on the optional brackets of the rotatable machine part and the sealing surfaces on the stationary machine part are of identical construction, such that each sealing surface on the rotating machine part may be brought into sealing engagement with each sealing surface on the stationary machine part, wherein the corresponding transfer openings are substantially aligned with each other.

So that the sealing surfaces cannot come inadvertently into contact during rotation of the rotatable machine part, which could lead to damage, the sealing surfaces on the stationary machine part are prestressed away from engagement with the opposing sealing surfaces of the rotatable machine part. In the embodiment with at least one prestressed non-return valve at the outlet opening of the stationary machine part, it is also provided that the spring force of the prestressing springs of the non-return valve on the stationary machine part is greater than the spring force with which the seal surface of the stationary machine part is prestressed away from engagement. When a transfer means is loaded with pressure from the corresponding supply line, firstly the prestressing force of the spring which prestresses the sealing surface away from engagement is overcome, such that firstly engagement between the sealing surfaces (optionally with the interposed sealing ring) is ensured, and only then is the force of the spring of the non-return valve overcome by the correspondingly higher pressure, such that this latter opens and allows the fluid to flow through the transfer openings, which are externally sealed along the sealing surfaces.

From the point of view of manufacture, the devices according to the present invention which are particularly preferred are those in which the sealing surfaces are arranged either in planes perpendicular to the axis of rotation or in planes tangential to the axis of rotation. Where the former embodiment is provided with a plurality of transfer openings, it goes without saying that all the sealing surfaces on the rotating machine part are preferably arranged in precisely the same plane perpendicular to the axis of rotation and that the same is true of all sealing surfaces on the stationary machine part, the latter sealing surface plane being displaced from the plane of the sealing surfaces of the rotatable machine part merely by a small switching distance in the axial direction. Where the sealing surfaces are arranged in tangential planes, corresponding cylindrical surfaces on the stationary machine part are provided with corresponding planar facets to enable engagement with planar sealing surfaces which, during rotation of the rotatable machine part, are arranged radially outside the radius of rotation of the respective rotating machine part and, when the rotating machine part is at a standstill, may be moved radially towards the respective opposing sealing surfaces in order to enter into sealing engagement therewith.

Further advantages, features and possible applications will become clear from the following description of a preferred embodiment and the associated Figures, in which:

BRIEF DESCRIPTION OF THE DRAWINGS

FIG. 1 is a plan view of the rotatable part of the transfer means according to the invention FIG. 2 shows a longitudinal section through a duct housing arranged on the stationary machine part with matching connection on the rotatable machine part, and FIG. 3 shows an enlargement of part of FIG. 2.

DESCRIPTION OF THE PREFERRED EMBODIMENTS

FIG. 1 shows, in plan view, a duct disk 3 (rotatable machine part) with connecting elements 31. The connecting elements 31 are substantially cylindrical components which are accommodated in bores in the transfer disk 3 and in turn comprise a central through bore 13 and a flange at one end, which flange serves to attach the connecting elements 31 to the disk 3 with the aid of screws 32 (see FIG. 3).

The disk 3 is welded to a shaft 33 and may be rotated with this shaft 33 about a central axis of rotation 10. Overall, four connecting elements 31 are arranged on the disk with 90° spacing, in the vicinity of the periphery of the disk. It goes without saying that the connecting elements 31 could also be attached to two arms arranged crosswise. FIG. 2 is a sectional view of a duct housing 5 associated with the stationary machine part 1, which duct housing 5 serves as a core piece of the transfer unit and is aligned with one of the connecting elements 31 of the disk 3. For the transfer of fluid, one of the connecting elements 31 has to be aligned with the fixedly mounted duct housing 5 and brought into alignment with the axial bore 19 thereof, so that fluid may be transferred. To this end, means, which are not shown in the Figures, are provided which, for the purpose of the delivery of fluid when the disk 3 is at a standstill, ensure that the disk 3 or the shaft 33 assumes a predetermined angular position with respect to rotation about the axis of rotation 10, such that either a particular one of the four connecting elements 31 or any one of the connecting elements is correctly aligned with the duct housing 5. Whether a particular one or any connecting element 31 is aligned with the duct housing 5 depends on whether, for example, all four connecting elements 31 supply one and the same consumer or whether each or a subgroup of the connecting elements 31 is associated with a particular consumption point, such that it is intended that fluid be supplied to this consumption point only by means of a particular connecting point 31 or a particular subgroup of connecting elements 31. In the latter instance, it is necessary, for example, for the disk 3 to be further rotated by 90° or another suitable angle after the transfer of fluid via one of the connecting elements 31, if fluid is to be conveyed via the other connecting elements 31 to the consumption points associated therewith.

A hose or tube is connected to the rear of the connecting elements 31, but is not shown here. Alternatively, the disk 3 could also comprise radial bores, which open sideways through the cylindrical wall of the connecting elements 31 into the bore 13, while the rear mouth of the bore 13 has accordingly to the closed.

FIG. 3 is essentially an enlargement of the duct housing 5 visible in FIG. 2 with the non-return valve 16 arranged therein.

The duct housing 5 has a radial bore 17 and an axial bore 19, wherein it should be emphasised that the axial bore 19 generally does not extend along the axis of rotation 10 of the rotatable machine part (duct disk) 3, but rather merely parallel to this axis of rotation, which, for clarification of this situation, is indicated by a broken line at the bottom of FIG. 3. In the axial bore 19 there is arranged a non-return valve 16 with a valve ball 18 which closes a hollow-cylindrical valve seat 7. This hollow-cylindrical valve seat 7 takes the form of a hollow-cylindrical screw which is screwed sealingly into a matching thread at the end of a valve piston 6. At its opposite end, the valve piston 6 comprises a circumferential collar 21, against which there rests one end of an approximately helical compression spring 11, which acts at the other end on the valve ball 18 and presses it against the valve seat 7.

At a distance from the valve ball 18, on the opposite side of the valve seat, there may be seen a valve stop 8, which in turn rests via webs 24 likewise against the collar 21 and which, under strong flow pressure from the fluid flowing through the open non-return valve 16, supports the valve ball 18 in a position in which it extensively releases the central opening of the hollow-cylindrical valve seat 7, wherein the valve ball 18 is prevented from moving still further in the direction of the duct opening 14, possibly closing the latter as the fluid pressure increases still further. The fluid may thus flow through the central opening in the hollow-cylindrical valve seat 7, around the exterior of the valve ball 18 and between the webs 24 of the valve stop 8 and out through the duct opening 14, which is defined by the circumferential, inwardly projecting collar 21 of the valve piston 6. The end of the valve piston 6 remote from the hollow-cylindrical valve seat 7 defines the seal surface 4, which in turn comprises a circumferential groove 22 in which a resilient sealing ring 23 is accommodated. Sealing ring 23 and groove 22 are so dimensioned that the sealing ring 23 projects in the axial direction beyond the plane of the end face of the valve piston 6 and thus may enter into engagement with the opposing seal surface 2 on a rotatable machine part (duct disk) 3.

For its part, the valve piston 6 is guided axially movably in the axial bore 19 and is kept prestressed by a spring 12 in the direction away from engagement with the sealing surface 2 of the rotatable machine part (sealing disk) 3. To this end, the duct housing 5 comprises an annular retaining plate 9, which surrounds the axial bore 19 in the manner of a ring and is attached to the duct housing 5 by means of screws 15 after insertion of the valve piston 6. The ring plate 9 also comprises an inwardly projecting collar, on which the prestressing spring 12 rests with one end, while the other end of the prestressing spring 12 acts on an outer collar 25 positioned on the outer wall of the valve piston 6. The axial bore 19 takes the form of a stepped bore, wherein the step of this bore forms a stop for the outer collar 25 of the valve piston 6, which thus defines the one end position of the valve piston 6, in which the sealing surfaces 2, 4 are out of engagement. In the tapered part of the axial bore 19, there is also provided an annular groove, which accommodates a sliding seal 20, which is in engagement with the outside of the valve piston 6, such that the valve piston 6 is guided axially movably but in sealed manner in the axial stepped bore 19. Another step on the outside of the valve piston 6 near the end which comprises the sealing surface 4 serves as a limit stop which prevents overloading of the prestressing spring 12. Otherwise, in normal operation the movement of the valve piston 6 is limited by the engagement of the sealing surfaces 2, 4 or of these surfaces with the interposed sealing ring 23, wherein the inner faces of the circumferential groove in the sealing surface 4 are viewed as part of this sealing surface 4.

The fluid is supplied through the radial bore 17 and first of all loads the end, on the left-hand side in FIG. 3, of the valve piston 6 comprising the hollow-cylindrical valve seat 7 and the surface of the valve ball 18 inside the hollow-cylindrical valve seat 7. When pressure is low, the pressure force acting on the valve ball 18 is insufficient to compress the compression spring 11; instead this force is merely transmitted via the compression spring 11 to the inwardly projecting collar 21 of the valve piston 6 and thus also to the prestressing spring 12. In addition, the pressure which is exerted on the hollow-cylindrical valve seat 7 and the end face of the valve piston 6 also acts on the prestressing spring 12. Once a certain pressure is reached, which nonetheless is still insufficient to overcome the force of the compression spring 11, the entire valve piston 6 is therefore moved to the right in FIG. 2 against the force of the prestressing spring 12, until the resilient sealing ring 23 enters into engagement with the sealing surface 2 of the rotatable machine part (duct disk) 3. Owing to the various surfaces on which the pressure force to be absorbed by the compression spring 11 acts, in contrast to the pressure force to be absorbed by the prestressing spring 12, the spring rate of the compression spring 11 does not have necessarily to be greater than that of the prestressing spring 12 in order to ensure the desired switching sequence, namely firstly bringing the sealing ring 23 into engagement with the opposing sealing surface 2 through displacement of the valve piston 6 and subsequently opening the non-return valve 16 by displacement of the valve ball 18 against the force of the compression spring 11, after sealing engagement has been ensured and the pressure has risen accordingly.

The duct housing 5 is attached to a stationary machine part (not shown) by means of screws (likewise not shown) which engage in tapped holes 26 arranged at the outer periphery of the duct housing 5. It goes without saying that this attachment should be as rigid as possible, so that the sealing surfaces 2, 4 or the sealing ring 23 and the sealing surface 2 may be brought into uniformly tight engagement.

It goes without saying that the duct housing 5 and the connecting elements 31 may be rotated by 90° in the plane of the paper and relative to the axis of rotation 10, such that the previously axially parallel bores 19 and 13 extend in the radial direction, while ultimately the alignment of the previously radial bore 17 does not matter. The portion of the rotatable machine part (duct disk) 3 shown could then, for example, constitute a radially extending connecting branch with a connecting element 31 at its free end.

What is claimed is:

1. A device comprising a stationary machine part (1) and a rotatable machine part (3) being rotatable about an axis of rotation (10), said device being adapted to transfer at least one fluid between said stationary machine part (1) and said rotatable machine part (3), wherein at least one of at least two mutually engageable sealing surfaces (2, 4) is arranged on each of the stationary (1) and rotatable (3) machine parts and wherein a transfer opening is provided in each of the sealing surfaces (2, 4) which is in turn connected with supply or discharge lines, characterised in that the respective sealing surfaces (2, 4) and transfer openings (13, 14) are arranged eccentrically with respect to the axis of rotation (10).

2. A device according to claim 1, characterised in that the stationary machine part (1) is provided with a valve (16) which closes the duct opening (14) close to the seal surface (4).

3. A device according to claim 1, characterised in that the rotatable machine part (3) is provided with a valve which closes the opening (13) close to the sealing surface (2).

4. A device according to claim 2, characterised in that the valve (16) is a non-return valve prestressed counter to the direction of flow of the fluid.

5. A device according to claim 1, characterised in that a duct opening (13) of the rotatable machine part (3) is arranged on a bracket of the rotatable machine part (3).

6. A device according to claim 5, characterised in that a plurality of brackets with duct openings (13) are provided symmetrically with respect to the axis of rotation (10).

7. A device according to claim 1, characterised in that a plurality of transfer openings (14) are arranged on the stationary machine part (1).

8. A device according to either claim 6, characterised in that the plurality of sealing surfaces on the stationary machine part (1) and/or the rotatable machine part (3) are of identical construction.

9. A device according to claim 1, characterised in that a groove encircling a duct opening (13, 14) is proved in at least one of the mutually opposed sealing surfaces (2, 4) to accommodate a resilient sealing ring (23).

10. A device according to claim 1, characterised in that at least one duct housing (5) is provided on the stationary machine part (1), on which duct housing (5) there is arranged a seal surface (4) which may be moved in the direction of the opposing seal surface (2) and is prestressed away from engagement.

11. A device according to claim 10, characterised in that a spring force of a valve on the stationary machine part (1) and prestressed in the closing direction is greater than the prestressing force of the sealing surface (4), which is prestressed away from engagement with the opposing sealing surface (2) on the duct housing (5).

12. A device according to claim 1, characterised in that the sealing surfaces are arranged in planes which extend perpendicularly to the axis of rotation (10) of the rotating machine part (3).

13. A device according to claim 1, characterised in that the sealing surfaces (2, 4) are arranged in planes tangential to the axis of rotation (10).

14. A device according to claim 7, wherein said plurality of transfer openings (14) are arranged symmetrically on the stationary machine part (1) with respect to the axis of rotation (10).

* * * * *